United States Patent [19]

Nemer

[11] Patent Number: 6,144,253

[45] Date of Patent: Nov. 7, 2000

[54] DIGITAL FSK DEMODULATOR

[75] Inventor: Joseph C. Nemer, Mayfield Hts., Ohio

[73] Assignee: Elsag International N.V., Amsterdam, Netherlands

[21] Appl. No.: 08/949,149

[22] Filed: Oct. 27, 1997

[51] Int. Cl.[7] .................................................. H04L 27/14
[52] U.S. Cl. ......................... 329/300; 329/303; 375/324; 375/334; 375/340; 455/214
[58] Field of Search ..................................... 329/300, 303; 375/334, 272, 340, 303, 327, 324; 327/159, 160; 455/214

[56] References Cited

U.S. PATENT DOCUMENTS

| | | | |
|---|---|---|---|
| 3,656,064 | 4/1972 | Giles et al. | 329/303 |
| 5,311,556 | 5/1994 | Baker | 375/303 |

*Primary Examiner*—Arnold Kinkead
*Attorney, Agent, or Firm*—Michael M. Rickin

[57] ABSTRACT

A FSK demodulator which uses the combination of a digital phase comparator and a digital controlled oscillator (DCO) in the form of a state machine to demodulate an FSK signal. The phase comparator compares the phase of the FSK signal with the output of the DCO to provide a signal to the DCO having a level dependent on the phase relationship between the two signals at the input to the comparator. The demodulator also includes a filter to obtain the data from the signal at the output of the comparator.

17 Claims, 3 Drawing Sheets

DIGITAL FSK DEMODULATOR

CROSS REFERENCE TO RELATED APPLICATION

My U.S. patent application Ser. No. 08/699,638 filed on Aug. 19, 1996, now U.S. Pat. No. 5,712,878, and assigned to the same assignee as the present invention, describes and claims a digital FSK modulator.

FIELD OF THE INVENTION

The invention relates to frequency-shift keying (FSK) and more particularly to a digital FSK demodulator.

DESCRIPTION OF THE PRIOR ART

FSK is a form of frequency modulation wherein the modulating wave shifts the output frequency between predetermined values corresponding to the frequencies of correlated sources. Digital FSK receivers are known. One example of such a receiver is described in U.S. Pat. No. 5,311,556 which issued to William E. Baker on May 10, 1994 and is assigned to the predecessor of the assignee of this application.

The FSK receiver of Baker has a zero crossing detector to detect the zero crossings of the FSK signal. The receiver also includes a zero crossing counter which counts the number of pulses of a first clock signal that occur between a detected zero crossing and the next zero crossing. Upon the occurrence of the next zero crossing the count in the counter is stored in a register. On each pulse of a second clock signal, the count in the register is inserted in a 16 deep, 8 bit wide first in first out (FIFO) buffer. An accumulator stores the sum of the values in the FIFO buffer. The baseband output is taken from the 12th stage of the accumulator.

The FSK frequency for a zero is 30.5 KHz and the FSK frequency for a one is 19 KHz. In Baker, the first clock frequency is 6 MHz, yielding a count of 98 in the register if the received signal is a continuous zero and a count of 158 in the register if the received signal is a continuous one. Therefore, a continuous zero in the received signal gives a count of 1568 (98*16) in the accumulator and a continuous one in the received signal gives a count of 2528 (158*16) in the accumulator. The mid-point between these two counts is 2048 or 2**11th and a one in the 12th stage of the accumulator has a value of 2048.

While the FSK demodulator described in Baker works well in practice, it is desirable to have an all digital FSK demodulator that is easier to design and analyze, has less circuitry and a lower clock frequency than the demodulator described in Baker. The lower the clock frequency of the demodulator, the less power the demodulator will consume.

SUMMARY OF THE INVENTION

A demodulator for demodulating a FSK modulated signal having a level and data therein to obtain the data. The demodulator has a phase comparator for generating a first signal with one of two levels depending on the phase relationship of said FSK modulated signal level to the level of a second signal. The demodulator also has a state machine having a closed loop with a predetermined total number of states, The state machine responds to the first signal for producing the second signal with a frequency that is a function of the first signal level. The first signal level determines how many of the predetermined total number of states the state machine must traverse to complete the closed loop. The demodulator further has first means for filtering the first signal to obtain the data in the FSK modulated signal.

A method for demodulating a FSK modulated signal having a level and data therein to obtain the data. The method has the step of generating a first signal with one of two levels depending on the phase relationship of said FSK modulated signal level to the levels a second signal. The method also has the step of traversing a loop of a state machine having a predetermined total number of states in response to the first signal. The first signal level determines how many of the predetermined total number of states the state machine must traverse to complete the loop. The has the further step of producing the second signal from the state machine with a frequency that is a function of the first signal level. The method also has the further step of filtering the first signal to obtain the data in the FSK modulated signal.

A demodulator for demodulating a FSK modulated signal having data therein to obtain the data. The demodulator has a phase comparator for generating an output signal in response to the FSK modulated signal and a signal from a state machine. The output signal has a pulse width which is proportional to the difference in phase between the FSK modulated signal and the signal from the state machine. The state machine has a closed loop which has a predetermined total number of states. The state machine responds to the phase comparator output signal for producing the signal from the state machine with a frequency that is a function of the phase comparator output signal pulse width. The phase comparator output signal pulse width determines how many of the predetermined total number of states the state machine must traverse to complete the closed loop. The demodulator also has means for filtering the phase comparator output signal to obtain the data in the FSK modulated signal.

A method for demodulating a FSK modulated signal having data therein to obtain the data. The method has the step of generating a first signal with a pulse width which is dependent on the difference in phase between the FSK modulated signal and a signal from a state machine having a predetermined total number of states. The method also has the step of traversing a loop of the state machine in response to the first signal. The first signal pulse width determining how many of the predetermined total number of states the state machine must traverse to complete the loop. The further has the step of producing the signal from the state machine with a frequency that is a function of the first signal pulse width. The method also has the further step of filtering the first signal to obtain the data in the FSK modulated signal.

DESCRIPTION OF THE DRAWING

FIGS. 6a, 6b, 6c, 6d, 6e and 6f show, respectively, the waveform for the FSK input signal, the DCO output signal, the error signal, the error signal after it is partially filtered by pulse stream filter A, the signal at the output of pulse stream filter B, and the data out signal from the demodulator of the present invention.

DESCRIPTION OF THE PREFERRED EMBODIMENT(S)

Figure 1:
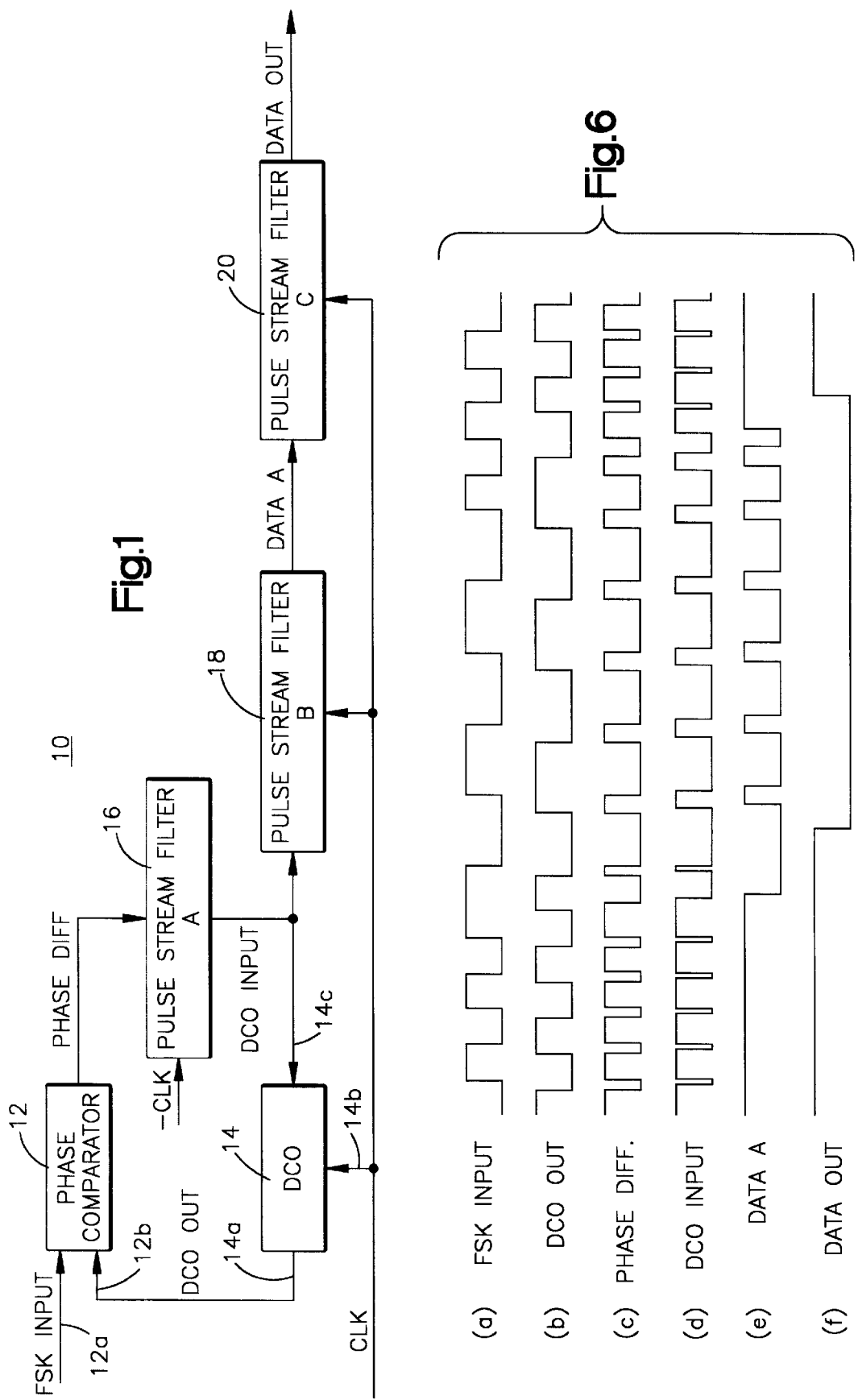
FIG. 1 shows a block diagram of a demodulator embodied in accordance with the present invention.

Referring now to FIG. 1, there is shown a block diagram of a demodulator 10 embodied in accordance with the present invention. Demodulator 10 includes digital phase comparator 12 which receives at its input 12a a FSK signal. Comparator 12 functions as an Exclusive OR gate. The comparator 12 also receives at its input 12b the output 14a of digital controlled oscillator (DCO) 14. Therefore, comparator 12 provides at its output a zero when the inputs 12a and 12b are both either a zero or a one and a one when either input 12a or 12b is a one and the other input is a zero.

As will be described in more detail in connection with the flow diagram of FIG. 2, DCO 14 is a state machine having a circular loop comprised of a predetermined number of states. In the embodiment described herein the DCO 14 has ten states.

DCO 14 receives at input 14b a clock signal and at input 14c the output of pulse stream filter A 16. Filter A 16 receives the output of comparator 12 and the clock signal. Demodulator 10 also includes a pulse stream filter B 18 which receives the output of pulse stream filter A 16 and the clock signal and a pulse stream filter C 20 which receives the output of pulse stream filter B 18 and the clock signal.

The amplitude of the signal at input 14c determines how DCO 14 progresses through the states. At each clock cycle, the input signal at 14c is sampled to determine the next state. DCO 14 provides a transition at its output 14a each time it completes the loop and this becomes a signal with a variable frequency. The frequency at output 14a depend on how fast the state machine completes the circular loop of states.

Pulse stream filter A 16 is a special form of a synchronous up/down counter. The counter increments or decrements its current value by one at each clock cycle based on the input level from comparator 12 when the clock is active. When the input level from the comparator is a one, the counter counts up by one, and when the input from the comparator is a zero, the counter counts down by one.

When the synchronous counter reaches its upper or lower limit it does not roll over as does the classical up/down counter. Instead, the synchronous counter will stay at the upper or lower limit until the input from comparator 12 changes to the other level. When the change in level occurs, the synchronous counter will resume counting by one in the other direction. The counting will continue until the counter once again reaches its upper or lower limit.

The output of the synchronous counter is one when the count value in the counter is higher than the mid value. The output of the synchronous counter is zero when the count value in the counter is lower than the mid value. In one embodiment for demodulator 10, filter A 16 was embodied by a two bit synchronous counter which counts up to four and down to zero and has a mid value of two. In this embodiment, the output of filter A 16 is zero when the count in the counter is zero or one and is one when the count in the counter is three or four.

As those of ordinary skill in the art can appreciate, filter A 16 functions to filter out individual pulses that are in the bit stream at its input. It is used in demodulator 10 to reduce the number of pulses that appear at the input 14c of DCO 14.

Pulse stream filter B 18 is also a synchronous counter and therefore functions in a manner identical to that described above for filter A 16. In one embodiment for demodulator 10, filter B 18 was also embodied by a two bit synchronous counter.

Figure 3:
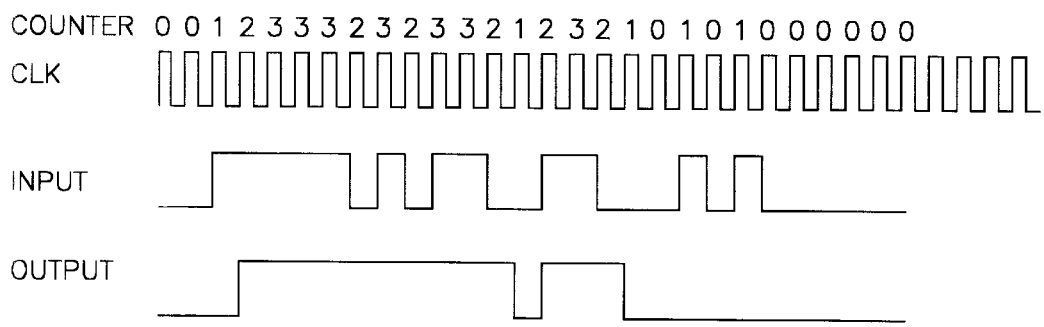
FIG. 3 shows the signals involved in the pulse stream filters A and B of FIG. 1, namely the clock, input and output signals, and the value of the counter that is included in each of the pulse stream filters.

The waveforms of the input, clock, and output signals of pulse stream filters A 16 and B 18 for the embodiment described herein are shown in FIG. 3. The count in the synchronous counter is also shown in FIG. 3 above the waveform for the clock signal.

Pulse stream filter C is also a synchronous counter except it has additional count hysteresis on its output. An output signal is generated based on the value of the counter. The output is one when the count value is higher than the mid value by a specified number of counts. The output is zero when the count value is lower than the mid value by a specified number of counts. The specified number of counts that the count must be higher or lower than the mid value in order for the output to be either a one or a zero are known as the hysteresis limits. When the count value is in between the two hysteresis limits, the output of the counter remains at its current state.

In one embodiment for demodulator 10, filter C 20 was embodied as a four bit synchronous counter that counts up to 16 and down to zero. The output had an upper hysteresis limit of nine and a lower hysteresis limit of three. Therefore, the output is a zero when the count in the counter is three or less, and is a one when the count in the counter is nine or more.

When the count in the counter is between four and eight, the output does not change and remains at what it was just before the counter entered into the four to eight count range. Therefore, if the counter entered the four to eight range from a count of three the output remains at a zero as long as the counter remains in that range, and if the counter entered the range from a count of nine the output remains at a one for as long as the counter remains in the range.

As can be appreciated by those of ordinary skill in the art, filter C 20 functions to filter out pulses of multiple clock length from the bit stream appearing at the input to the counter. It is used in demodulator 10 to eliminate unnecessary transitions in the decoded data.

Figure 5:
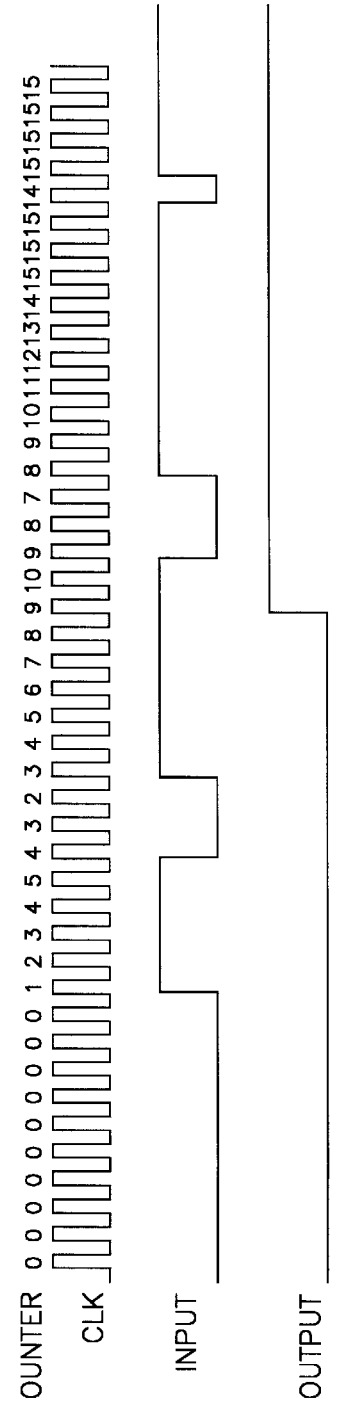
FIG. 5 shows the signals involved in the pulse stream filter C of FIG. 1, namely the clock, input and output signals, and the value of the counter that is included in the pulse stream filter.

The waveforms for the input, clock and output signals for pulse stream filter C 20 are shown in FIG. 5. The count in the synchronous counter is also shown in FIG. 5 above the waveform for the clock signal. FIG. 5 shows the effect of the count hysteresis included in the counter as the output signal remains low until the count in the counter reaches nine, at which count the output signal becomes high. Thereafter, the output signal remains high even though the count in the counter drops to seven.

Figure 2:
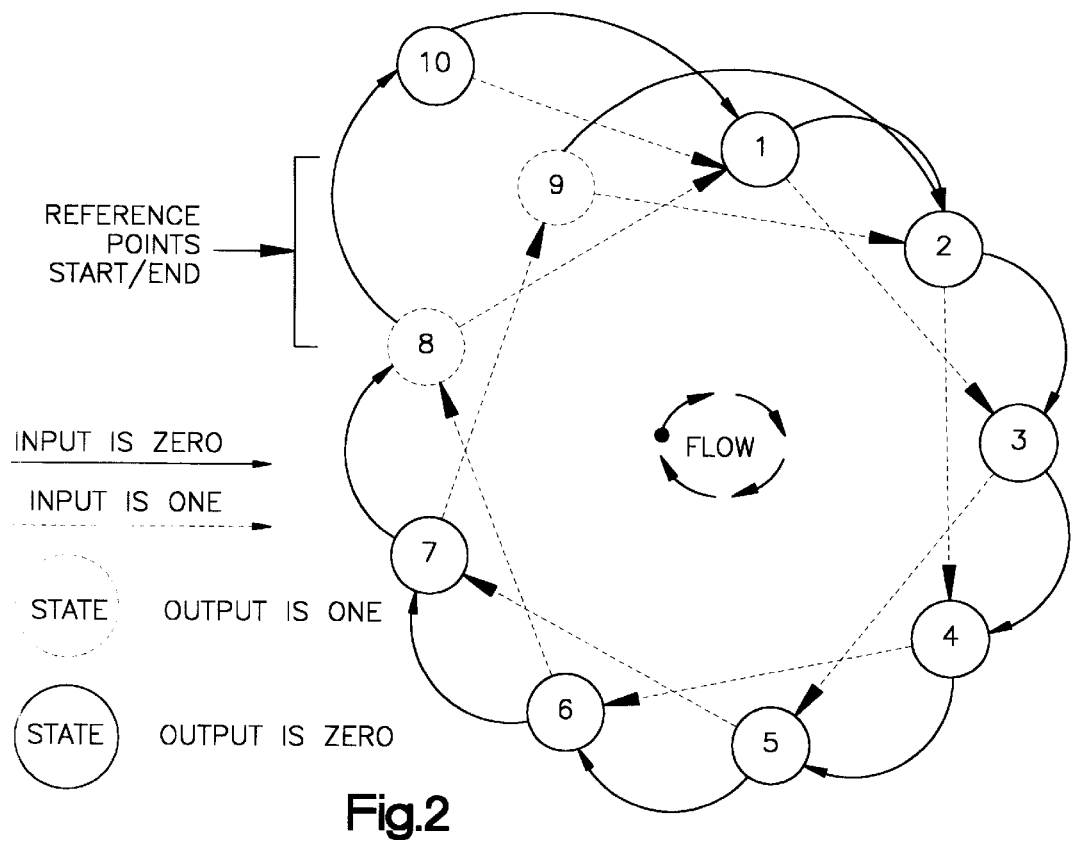
FIG. 2 shows a flow diagram of the digital controlled oscillator (DCO) state machine shown in FIG. 1.

Referring now to FIG. 2, there is shown a flow diagram of state machine 14 having a circular loop comprised of ten states. FIG. 2 shows ten circles which are numbered from 1 to 10 in a clockwise direction. Each circle represents a state and, as is described in more detail below, states 8, 9 and 10 are points of reference that are both the start and the end of the state machine. At each cycle of the clock signal, the state machine will move one or more states in the clockwise direction.

The number of states that state machine 14 moves in the clockwise direction for each cycle and the particular reference point depends on the state or level of the output of pulse stream filter A 16 received at the input 14c at the occurrence of the next clock cycle. If the input is low, that is a zero, and continues to remain low, the reference point is state 10 and the state machine, will as a general rule, move to the next adjacent higher state. The only exception to the general rule is when the state machine is in state 8 and the input continues to remain low. In that instance, the state machine skips over state 9 and moves directly to reference state 10 from state 8. Therefore, if the state machine is in state n and the input is low at the next clock cycle the state machine will move to state n+1, except if the state machine is in state 8.

If the input is high, that is a one, the state machine as a general rule skips the next adjacent state and moves to a state that is two higher than the state it was in. Therefore, if the state machine is in state n and the input is high at the next clock cycle the state machine will, except as described below, move to state n+2.

In the present embodiment, when the input is high, that is a one, the state machine 14 will, if it is in state 1 (and the input remains high,) move to state 3, then (if the input remains high) to state 5, then (if the input remains high) to state 7, and then (if the input remains high) to state 9, which is the reference state for this loop.

It would be expected that if the input remains high, the state machine 14 will then move to state one to thereby repeat the movement through the loop described above for a continuous high input. In the present embodiment that is not the case. With the input remaining high, the state machine moves to state two and thus skips not only state 10 but also state 1. With the input remaining high, the state machine passes through states 4, 6 and 8. The state machine then skips states 9 and 10 and goes to state 1. Therefore, the reference point for this completion of the loop is state 8.

With the input continuing to remain high, the state machine then passes through states 3, 5, 7 and 9 to complete the next loop. Therefore, with the input remaining a continuous high the state machine travels through four states to complete a loop and then travels through five states to complete the next loop. With the input remaining high, the state machine completes the next subsequent loop by traveling through four states. Thus, with the input remaining a continuous high the state machine completes two successive loops by traveling through a minimum of four states in one loop and a minimum of five states in the next loop, and for as long as the input remains high, follows each loop completed by traveling through four states with a loop that is completed by traveling through five states.

Thus, state machine 14 crosses through the reference points (states 8, 9 or 10) at a rate that depends on the level of the signal at input 14c. If the signal at input 14a is always a zero the state machine completes each loop in nine clock cycles as it skips over state 9. If the signal at input 14c is always a one the state machine completes a first loop in five clock cycles and a second loop in four clock cycles. If the signal at input 14c changes from a zero to a one or vice versa during the cycling of the state machine through a loop, the state machine completes the loop in between four or five and ten clock cycles depending on where in the loop the input changed its level. Therefore, in the embodiment described herein the number of possible states or clock cycles in a complete loop are either 4.5 (the average of completing one loop in four clock cycles and the next loop in five clock cycles), 5, 6, 7, 8 or 9.

The signal at the output of state machine 14 is a zero for all states of the machine except the reference states. The signal at the output of the state machine is a one whenever the state machine is in the reference state. Therefore, a pulse will be generated at the output of the state machine each time the state machine crosses the reference state. As can be appreciated from the description herein, the rate at which the pulses are generated at the output of the state machine depends on how many states the machine must complete in each loop. The lower the number of such states, the more frequently the pulses appear at the output of the state machine and vice versa.

In one specific embodiment of the invention the clock frequency was selected to be 307 KHz. With the signal at the input 14c a constant zero, the number of states traveled in completing each loop is nine and the frequency of the signal, Freq., is using the equation described above:

Freq.=307 KHz/(2×9)=17.0 KHz.

Figure 4:
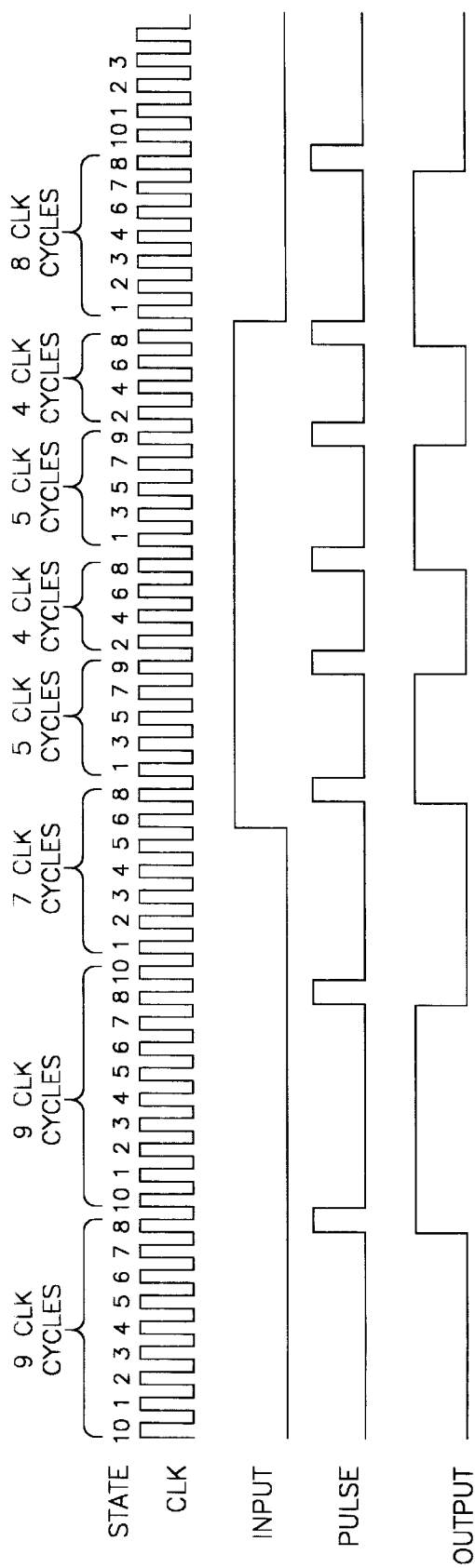
FIG. 4 shows the signals involved in the digital controlled oscillator (DCO) of FIG. 1, namely the clock, input and output signals and since a state machine is involved in the DCO, the state is shown at each clock cycle as well as the pulse out of the state machine.

The clock signal at input 14b, the constant zero at input 14c, the pulses at the output of the state machine, and the output 14a of the 17.0 KHz signal resulting therefrom are shown in FIG. 4.

In that same embodiment, with the signal at the input 14c a constant one, the average number of states traveled in completing each loop is 4.5 and the frequency of the signal, Freq., is using the equation described above:

Freq.=307 KHz/(2×4.5)=34.1 KHz.

The clock signal at input 14b, the constant one at input 14c, the pulses at the output of the state machine, and the output 14a of the 34.1 KHz signal resulting therefrom are shown in FIG. 4.

The operation of demodulator 10 will now be described. In demodulator 10, the phase comparator 12 continuously compares the FSK input signal to the FSK signal generated by DCO 14 in order to keep the DCO output signal locked to the incoming FSK signal. Phase comparator 12, filter A 16 and DCO 14 are connected to form a closed loop frequency feedback system and thereby function in a manner similar to an analog phase locked loop. One example of a waveform for the FSK input signal is shown in FIG. 6a and for the DCO output signal in FIG. 6b.

When an FSK input signal is applied to input 12a of phase comparator 12, the phase comparator compares the phase and frequency of the input signal with the phase and frequency of the DCO output signal 14a. As a result of the comparison, the phase comparator generates an error signal proportional to the phase and frequency difference between the FSK input signal and the DCO output signal. A waveform for the error signal resulting from the comparison of the FSK input and DCO output signals is shown in FIG. 6c.

The error signal is a digital signal which, if averaged over a certain period of time, would represent an analog average representing the phase difference. In the technique used in the present invention, however, no analog circuitry is involved. The error signal is partially digitally filtered through pulse stream filter A and is then applied to the input 14c of DCO 14. The partially filtered error signal varies in the direction that reduces the frequency difference between the frequency of DCO output signal and the frequency of the FSK input signal. The waveform for the partially filtered error signal is shown in FIG. 6d.

The closed loop forces the DCO 14 to lock on to the FSK input signal. When DCO 14 is in lock, the DCO output signal is identical to the FSK input signal in frequency and has a slight phase difference. The range of frequency that this demodulator can lock at is set by the frequency range of DCO 14. With no FSK input signal applied, the signal at the output of the phase comparator 12 is a data stream of equal ones and zeros which causes DCO 14 to operate at a frequency that is the middle of the DCO frequency range.

FIG. 6e shows the waveform of the signal at the output of pulse stream filter B 18 and FIG. 6f shows the waveform for the data out signal from demodulator 10.

It should be appreciated that the digital filtering provided in the FSK decoding technique by filters A, B, and C has advantages when the decoding technique of the present invention is used with field instrumentation. As is well known, field instrumentation are exposed to many environmental conditions which inject noise on the instrumentation's signals. A classical communication circuitry for such devices would employ an analog filter to reduce some of this externally induced noise. The analog filter is even more necessary if the decoding scheme is not tolerant to noise and duty cycle of the signal. The inherent digital filtering in the decoding technique of the present invention is well suited for use with field instrumentation as it reduces the requirement for prefiltering.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A demodulator for demodulating a FSK modulated signal having a level and data therein to obtain said data comprising:
    a) a phase comparator for generating a first signal with either one or the other of two levels depending on the phase relationship of said FSK modulated signal level to the level of a second signal;
    b) a state machine having a closed loop, said closed loop having a predetermined total number of states, said state machine responsive to said first signal for producing said second signal with a frequency that is a function of said first signal level, said first signal level determining how many of said predetermined total number of states said state machine must traverse to complete said closed loop; and
    c) first means for filtering said first signal to obtain said data in said FSK modulated signal.

2. The demodulator of claim 1 wherein said first signal level is (i) a first level when said FSK modulated signal level is the same as said second signal level, and (ii) a second level when said FSK modulated signal level is different than said second signal level.

3. The demodulator of claim 1 further comprising second means having an output, said second means connected between said phase comparator and said state machine for filtering said first signal, said state machine having an input, and said first filtering means connected to said second means output and said state machine input.

4. The demodulator of claim 1 wherein said predetermined total number of states in said state machine closed loop is ten.

5. The demodulator of claim 1 wherein when said first signal level remains constant at said one of said one or the other of two levels said state machine traverses all but one of said predetermined total number of states in said state machine closed loop in completing said loop.

6. The demodulator of claim 1 where when said first signal level remains constant at the other of said one or the other of two levels said state machine traverses in one complete cycle of said closed loop half of said closed loop predetermined total number of states.

7. The demodulator of claim 6 where when said first signal level remains constant at said other one or the other of said one of two levels said state machine traverses in another complete cycle of said closed loop that occurs immediately after said one complete cycle less than half of said closed loop predetermined total number of states.

8. A method for demodulating a FSK modulated signal having a level and data therein to obtain said data comprising the steps of:
    a) generating a first signal with either one or the other of two levels depending on the phase relationship of said FSK modulated signal level to the level of a second signal;
    b) traversing a loop of a state machine having a predetermined total number of states in response to said first signal, said first signal level determining how many of said predetermined total number of states said state machine must traverse to complete said loop;
    c) producing said second signal from said state machine with a frequency that is a function of said first signal level; and
    d) filtering said first signal to obtain said data in said FSK modulated signal.

9. The method of claim 8 wherein said first signal level is (i) a first level when said FSK modulated signal level is the same as said second signal level, and (ii) a second level when said FSK modulated signal level is different than said second signal level.

10. The method of claim 8 wherein said predetermined total number of states in said state machine closed loop is ten.

11. The method of claim 8 wherein when said first signal level remains constant at said one of said one or the other of two levels said state machine traverses all but one of said predetermined total number of states in said state machine closed loop in completing said loop.

12. The method of claim 8 where when said first signal level remains constant at the other of said one or the other of two levels said state machine traverses in one complete cycle of said closed loop half of said closed loop predetermined total number of states.

13. The method of claim 12 where when said first signal level remains constant at said other one or the other of said one of two levels said state machine traverses in another complete cycle of said closed loop that occurs immediately after said one complete cycle less than half of said closed loop predetermined total number of states.

14. A demodulator for demodulating a FSK modulated signal having data therein to obtain the data comprising:
    a) a phase comparator for generating an output signal in response to said FSK modulated signal and a signal from a state machine, said output signal having a pulse width which is proportional to the difference in phase between said FSK modulated signal and said signal from said state machine;
    b) said state machine having a closed loop, said closed loop having a predetermined total number of states, said state machine responsive to said phase comparator output signal for producing said signal from said state machine with a frequency that is a function of said phase comparator output signal pulse width, said phase comparator output signal pulse width determining how many of said predetermined total number of states said state machine must traverse to complete said closed loop; and c) means for filtering said phase comparator output signal to obtain said data in said FSK modulated signal.

15. The demodulator of claim 14 wherein said phase comparator output signal has one of two pulse widths depending on the difference in phase between said FSK modulated signal and said signal from said state machine.

16. A method for demodulating a FSK modulated signal having data therein to obtain the data comprising the steps of:

a) generating a first signal with a pulse width which is dependent on the difference in phase between said FSK modulated signal and a signal from a state machine having a predetermined total number of states;

b) traversing a loop of said state machine in response to said first signal, said first signal pulse width determining how many of said predetermined total number of states said state machine must traverse to complete said loop;

c) producing said signal from said state machine with a frequency that is a function of said first signal pulse width; and d) filtering said first signal to obtain said data in said FSK modulated signal.

17. The method of claim 16 wherein said phase comparator output signal has one of two pulse widths depending on the difference in phase between said FSK modulated signal and said signal from said state machine.

* * * * *